UNITED STATES PATENT OFFICE.

JOHN S. BOOTHBY, OF PORTLAND, MAINE.

IMPROVEMENT IN TANNING LEATHER.

Specification forming part of Letters Patent No. 43,563, dated July 19, 1864.

*To all whom it may concern:*

Be it known that I, JOHN S. BOOTHBY, of Portland, in the county of Cumberland and State of Maine, have made a new and useful Invention having reference to the Tanning of Hides and Skins; and I do hereby declare the same to be fully described as follows:

The materials used in the preparation of my composition for tanning, together with the proportions of them to be used, may be stated as follows, it being understood that the proportions may be somewhat varied without materially affecting the results: two hundred and fifty pounds terra-japonica, fifty pounds of sumac, twenty-five pounds of divi-divi, twenty-five pounds of sweet-fern, twenty pounds of Glauber's salt, six pounds of saltpeter, and one hundred and seventy gallons of soft water. The above-specified quantity of said ingredients properly compounded is required to tan either sixty sides of heavy leather (or upper leather) or one hundred and fifty calf-skins. The said ingredients are to be prepared or compounded in the following manner, to wit: The sumac, divi-divi, and sweet-fern are to be put into a vat or leach of requisite dimensions to contain them, together with a sufficient quantity of the soft water to steep them in, the water to be at a temperature of not less than 150° Fahrenheit. The decoction should stand about twelve hours, at the expiration of which time the liquid should be drawn off into the vat to receive the hides for being tanned. The hides having been prepared in the usual mode, the saltpeter and Glauber's salt should next be dissolved in water and poured into the decoction, after which the mixture should be warmed to 90° Fahrenheit, and the hides should be deposited in the vat with the mixture, where they should remain twenty-four hours, being frequently handled in the meantime. Next the terra-japonica should be thoroughly dissolved in about sixty gallons of the water, after which ten gallons of the decoction should be poured into the vat containing the hides. The residue should be added at the discretion of the tanner until the hides may be tanned, adding daily such quantity of the decoction as he may find requisite to keep up the strength of the compound.

The time required by this process for tanning the different kinds of hides varies from ten to sixty days.

The ingredients of the liquid compound are applied for their respective qualities—viz., the sumac, divi-divi, and sweet-fern are all astringents, the divi-divi possessing that quality in a larger degree than the others. It is deemed expedient, in their application, to use them together, all possessing coloring qualities, the divi-divi taking precedence in that respect also. The sweet-fern possesses an oily substance which imparts pliancy to the leather, and in connection with the other ingredients it performs a very important function. The terra-japonica, having astringent properties more powerful than the other astringents above mentioned, is used in the compound as the principal agent for contracting the fibrine of the skin; but without the aid of the other ingredients it would produce a harshness calculated to destroy the pliancy of the leather effected by their application, and would also tend to disadvantageously affect the beautiful color produced by them. The application of the Glauber's salt in the compound is for plumping the hides, thereby facilitating the absorption of the other ingredients by it and expediting the process of tanning of them. The saltpeter is introduced into the compound on account of its penetration and preservative qualities, whereby it facilitates the action of the other ingredients, and is useful in other respects.

I do not claim the use of either of said ingredients separately; but

What I claim as my invention, and desire to secure by Letters Patent, is as follows:

1. The tanning composition, substantially as hereinbefore described.

2. The above-specified process of tanning by the materials as hereinbefore described.

JOHN S. BOOTHBY.

Witnesses:
R. H. EDDY,
FREDERICK CURTIS.